(12) United States Patent
Chen et al.

(10) Patent No.: US 6,522,456 B2
(45) Date of Patent: Feb. 18, 2003

(54) DYNAMIC OPTICAL FILTER

(75) Inventors: Qiushui Chen, Medford, MA (US);
Hua Jiang, Mansfield, MA (US);
Yingyin Zou, Burlington, MA (US);
Dean Tsang, Burlington, MA (US);
Paul Melman, Newton, MA (US);
Feiling Wang, Medford, MA (US);
Guanghai Jin, Boxborough, MA (US);
Jing Zhao, Winchester, MA (US)

(73) Assignees: Corning Applied Technologies, Inc., Woburn, MA (US); Corning Incorporated, Corning, NY (US)

( * ) Notice: Subject to any disclaimer, the term of this patent is extended or adjusted under 35 U.S.C. 154(b) by 0 days.

(21) Appl. No.: 09/848,766

(22) Filed: May 4, 2001

(65) Prior Publication Data

US 2002/0163707 A1 Nov. 7, 2002

(Under 37 CFR 1.47)

(51) Int. Cl.[7] .................................................. G02F 1/00
(52) U.S. Cl. ........................ 359/322; 359/239; 359/245; 359/246; 359/248; 359/256; 359/323
(58) Field of Search ................................ 359/248, 245, 359/246, 251, 252, 254, 255, 256, 239, 322, 323; 385/8, 2, 3; 372/26, 27, 28

(56) References Cited

U.S. PATENT DOCUMENTS

| 4,516,837 A | 5/1985 | Soref et al. | |
|---|---|---|---|
| 5,283,843 A | 2/1994 | Olmstead | |
| 5,305,136 A | 4/1994 | Smith | 359/247 |
| 5,347,377 A | 9/1994 | Revelli, Jr. et al. | |
| 5,408,548 A | 4/1995 | Olmstead | 385/16 |
| 5,461,504 A | 10/1995 | Johnson et al. | |
| 5,751,384 A | 5/1998 | Sharp | 349/18 |
| 5,929,946 A | 7/1999 | Sharp et al. | 349/18 |
| 5,953,083 A | 9/1999 | Sharp | 349/18 |
| 5,999,240 A | 12/1999 | Sharp et al. | 349/119 |
| 6,133,980 A | 10/2000 | Faris | 349/176 |
| 6,137,619 A | 10/2000 | Chen et al. | 359/251 |
| 6,175,667 B1 | 1/2001 | Wang et al. | 385/3 |
| 6,219,121 B1 | 4/2001 | Sahouani et al. | 349/117 |
| 6,229,934 B1 | 5/2001 | Melman et al. | 385/18 |
| 6,273,571 B1 | 8/2001 | Sharp et al. | 353/122 |
| 6,285,500 B1 | 9/2001 | Ranalli et al. | |
| 6,330,097 B1 * | 12/2001 | Chen et al. | 359/239 |
| 6,339,492 B1 | 1/2002 | Terahara et al. | 359/283 |
| 2002/0003658 A1 | 1/2002 | Sorin | |

FOREIGN PATENT DOCUMENTS

WO     WO 99/67679     12/1999

OTHER PUBLICATIONS

"Liquid–Crystal Optical Harmonic Equalizers", Chiao, et al. ECOC '01 Amsterdam (434–435).

* cited by examiner

*Primary Examiner*—Hung Xuan Dang
*Assistant Examiner*—Tuyen Tra
(74) *Attorney, Agent, or Firm*—Hamilton, Brook, Smith & Reynolds, P.C.

(57) ABSTRACT

An apparatus and method for filtering an optical input is disclosed. In an illustrative embodiment, an optical input is split into polarization components along separate paths. The polarization components are then fed into a first electro-optic device that includes a set of electrodes across which a voltage is applied to adjust a wavelength transmission characteristic of the device. A section of the first device positioned between the electrodes preferably has a birefringence that is adjusted depending on the voltage applied across the electrodes. The adjusted components of the optical input are thereafter combined to produce an optical output. Accordingly, the optical input can be attenuated based on the voltage applied to electrodes of the first electro-optic device.

40 Claims, 17 Drawing Sheets

DYNAMIC OPTICAL FILTER

BACKGROUND OF THE INVENTION

Light modulated signals in an optical communication system typically deteriorate depending on the integrity of its system components. For example, an optical signal transmitted over a channel of a fiber cable can be distorted due to imperfections in the cable itself. In certain applications, distortion of an optical signal is detectable after traveling over just a few feet of fiber cable. This type of signal distortion is often exacerbated when an optical signal is transmitted over a long haul such as thousands of feet of fiber cable.

Fiber optic cables and other optical communication components can distort optical signals depending on the wavelength over which the signals are transmitted. Consider an optical system in which multiple optical signals are transmitted over separate channels, each of which is defined by a particular wavelength. Based on the characteristics of the communication system and its components, certain optical signals can be attenuated or distorted more than others depending on the wavelength at which the optical signal is transmitted. This can result in an uneven spectral profile. Consequently, optical signals received at an end of a long cable can have different signal power levels and different signal to noise ratios, which can impair the performance of an optical communication system.

In addition to fiber cables, another component typically used in an optical communication system that can negatively effect a spectral profile is Raman scattering. The spectral profile in a fiber Raman Amplifier can vary from −0.08 dB/nm to 0.08 dB/nm. Using a low pump power setting and a long fiber, an overall Raman gain is typically biased towards longer wavelength channels due to the accumulation of Raman gain produced by the signal channels. Using high pump power and a shorter fiber cable, shorter wavelength channels typically experience a higher gain than longer wavelength channels. As a result, a spectral profile of multiple optical signals of differing wavelengths can become skewed so that the spectral profile of an optical communication system is no longer flat.

SUMMARY OF THE INVENTION

A feature of the present invention relates to a fixed or dynamic optical filter device to control an optical input at a single wavelength or multiple wavelengths.

One aspect of the present invention is generally directed towards an apparatus and method for filtering an optical input. In an illustrative embodiment, an optical input is split into polarization components along separate paths. The polarization components are then fed into a first solid state electro-optic device that includes electrodes across which a voltage is applied to adjust a wavelength transmission characteristic of the device. A section of the first electro-optic device positioned between the electrodes preferably has a birefringence that is adjusted depending on the voltage applied across the electrodes. The adjusted components are thereafter combined to produce an optical output. Accordingly, an optical input can be attenuated based on a voltage applied to electrodes of the first solid state device.

In one application, the first solid state device is used to filter one or multiple optical signals and the voltage applied across electrodes of the device is adjusted to attenuate a selected range of wavelengths of the optical input to produce an optical output. For example, the voltage applied across the electrodes of the first electro-optic device is controlled to adjust the phase difference of the separate polarization components at certain wavelengths. The adjusted components along separate paths are then recombined to produce an optical output signal that is generally an attenuated version of the optical input signal at selected wavelengths depending on the applied voltage.

Although the first solid state device for adjusting retardation of the input signal components can be made of almost any suitable material providing an electro-optic effect, at least a portion of the body of the first electro-optic device can be chosen from ceramic type of material such as PLZT, PMN, PMN-PT, or PLMNT. Likewise, the material can be chosen from crystal materials such as $LiNbO_3$, $LiTaO_3$ or PLMNT. For example, the first electro-optic device can be fabricated from a block of any such material, or combination of materials, to which an electric field can be applied. Preferably, electrodes are disposed directly on the block of material to apply the electric field. However, other methods of applying an electric field can be used in accordance with the principles of the present invention. In addition to materials similar to that previously mentioned, the body of the first electro-optic device additionally can be fabricated from a polymer material having birefringent characteristics.

In one application, the electro-optic device is fabricated using a liquid crystal material according to the principles of the present invention.

As previously discussed, a section of the electro-optic device disposed between corresponding electrodes has a variable birefringence that can be adjusted by controlling a voltage applied across the electrodes. In one application, the first electro-optic device additionally includes a section of material having a fixed birefringence. The section of fixed birefringence can be adjacently positioned relative to the section of variable birefringence to receive the polarization components along separate paths.

In yet another application, a second solid-state electro-optic device is also positioned to receive the polarization components transmitted along separate paths. The second electro-optic device preferably includes electrodes across which a second voltage is applied to adjust a polarization orientation of the optical components. Consequently, adjusting the polarization orientation of the separated optical components in this way adjusts a degree to which the optical input is attenuated at a particular wavelength to produce an output signal.

The second electro-optic device can be an optical retarder device sandwiched between two quarterwave plates.

Optionally, a Faraday rotator and a corresponding electromagnet device are provided in lieu of the second solid state device to adjust the polarization orientation of the optical input signal components. While a voltage applied across the first electro-optic device adjusts one or multiple wavelengths at which the optical input signal is attenuated, the Faraday rotator generally can be used to adjust the degree to which selected wavelengths are attenuated.

Another aspect of the present invention involves providing an attenuation profile for filtering a given optical input. Typically, the attenuation profile of the filter is approximately sinusoidal over a frequency range. Amplitude characteristics of an attenuation profile can be controlled by adjusting the second voltage across the electrodes of the second electro-optic device.

A phase of an attenuation profile for filtering the optical input signal can be adjusted. For example, the attenuation profile also can be shifted or changed across a range of wavelengths by adjusting the first voltage applied across the electrodes of the first electro-optic device.

When both the first and second electro-optic devices are used in a common application, both phase and amplitude characteristics of an attenuation profile can be adjusted based on corresponding voltages applied to the first and second electrodes. Additionally, multiple serially disposed filter stages, each including a combination of electro-optic devices, can be dynamically adjusted so that an optical output signal has a desired profile across a range of wavelengths. For instance, it can be particularly useful to dynamically adjust an output signal so that it has a flat spectral profile across a range of wavelengths.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
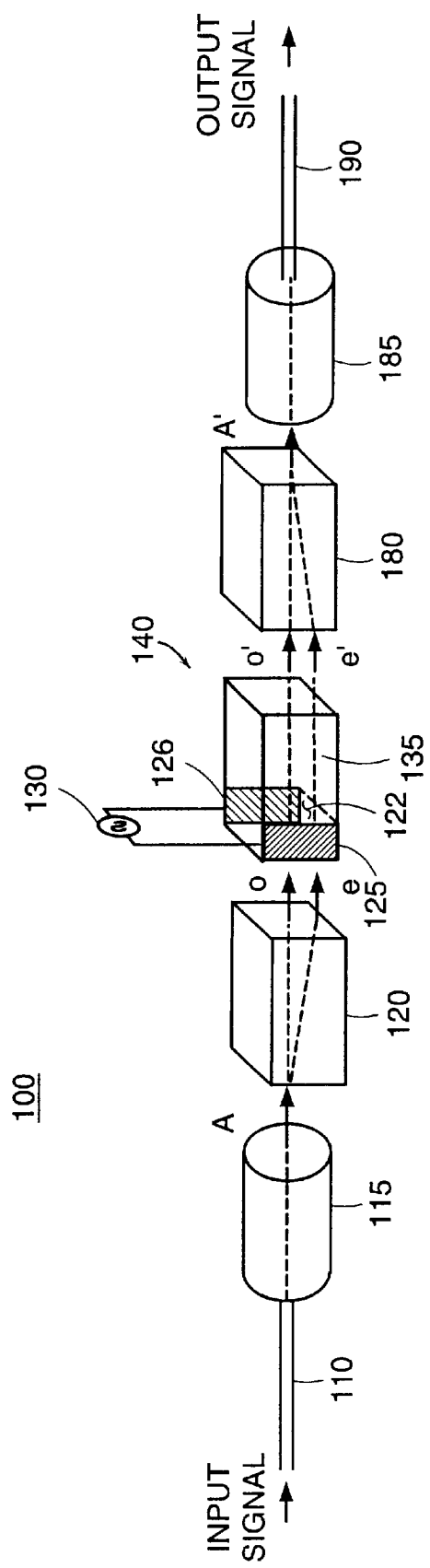
FIG. 1 is a pictorial diagram of an optical filter system according to certain principles of the present invention.

FIG. 1 is an illustrative optical system according to certain principles of the present invention. Features of this preferred embodiment can vary depending on a particular application.

One aspect of optical system 100 according to the principles of the present invention involves adjusting one or multiple optical input signals. Such signals can comprise multiple data channels, each of which is defined by a specified optical wavelength.

Generally, optical system 100 can be controlled to attenuate an optical input signal and produce a desired optical output signal. For example, in a specific application, an optical input signal having an uneven spectral profile, i.e., multiple channels having different power level, can be attenuated to produce a flatter spectral profile. This will be discussed in more detail later in the specification.

As shown, an optical input signal generally propagates from left to right along fiber cable 110 into collimator 115. At this point in optical system 100, the optical input signal is collimated by collimator 115 to produce light ray A, which is fed into beam splitter 120.

Preferably, optical input signal light ray A is split into two components with orthogonal polarization orientations designated "e" and "o" components.

It should be noted that the hardware components of optical system 100 are shown in an exploded block diagram for illustrative purposes. In an actual implementation, the components generally will be more tightly packed to produce a relatively small optical device. Thus, optical system 100 can be used in space-constrained applications.

The optical input can be separated into two beams that are perpendicularly polarized with respect to each other. More specifically, an e component can comprise a first polarization orientation axis of light ray A while an o component comprise a second polarization orientation axis (preferably 90 degrees with respect to the first axis) of light ray A. Accordingly, e and o components of the collimated optical input signal can be spatially and/or angularly unique with respect to each other.

One aspect of the present invention involves providing a solid state device such as retarder 140 to adjust the e and o components of an optical input signal. As shown, e and o components of the optical input signal along separate paths are fed into retarder 140. The characteristics of retarder 140 such as its birefringence can be adjusted to retard the phase difference between the e and o components traveling along separate paths. Retarder 140 can be a fixed and/or dynamically controlled optical retarder depending on the application.

Although retarder 140 can take on a variety of shapes, retarder 140 is typically block-shaped as shown. Electrodes 125, 126 are fabricated across section 122 of retarder 140 to produce an electric field. Typically, the electrodes are oriented so that they are parallel with respect to each other. Consequently, a uniform electric field can be produced in a selected section of retarder 140 between electrodes 125, 126 when a potential such as a DC (Direct Current) voltage is applied via source 130.

In one application, the electric field generated by the voltage applied across electrodes 125, 126 is oriented 45 degrees with respect to the polarization orientation of the e and o components, which are typically perpendicular as discussed. This can be achieved by properly rotating selected hardware components of optical system 100 about a lengthwise axis along which the optical input signal propagates. For example, retarder 140 can be physically oriented in a fixed position so that an applied electric field is 45 degrees with respect to the e and o polarization axis. Based on this preferred orientation of the electric field, characteristics of the e and o components are maximally effected by the electric field when so applied.

Although retarder 140 can be made of almost any suitable material, at least a portion of retarder 140 as shown is typically fabricated from materials such as liquid crystal, PLZT, PMN, PMN-PT, PLMNT, $LiNbO_3$, or $LiTaO_3$. For example, retarder 140 generally can be fabricated from any suitable birefringent material or combination of birefringent materials. Electrodes are preferably disposed on retarder 140 to apply an electric field, although an electric field can be applied in any suitable manner to adjust the birefringent characteristics of retarder 140. A section 135 of retarder 140 not disposed between electrodes 125, 126 can be Quartz, Sapphire, $YVO_4$, or $TiO_2$. Section 135 is also preferably positioned so that its fast (slow) axis aligns (or perpendicular) with the polarization orientation of material between electrodes 125, 126.

In addition to the preferred materials as previously mentioned, the body of retarder 140 additionally can be fabricated from a polymer material having birefringent properties. The polymer material chosen to fabricate retarder 140 preferably has a fixed birefringence that is otherwise adjustable based on the presence of an electric field.

The birefringent characteristics of retarder 140 positioned between electrodes can be controlled based on the voltage applied across electrodes 125, 126. More specifically, a voltage applied to electrodes 125, 126 can be varied to select the birefringence of retarder 140 positioned between the electrodes. Accordingly, the transmission characteristics, such as those based on phase, of the optical components e and o can be controlled to produce desired optical output components e' and o' as shown.

A range of voltages applied to electrodes 125, 126 for adjusting birefringence of retarder 140 can vary depending on a type of material used to fabricate retarder 140. For instance, when retarder 140 is fabricated from ceramic type material such as PLZT, PMN or the like, a range of zero to several hundred volts typically can be applied to support an amount of $2\pi$ retardation. Preferably, an applied voltage is 500 volts or less for ceramic type material to achieve appropriate retardation according to the principles of the present invention.

Crystalline material such as $LiNbO_3$ and $LiTaO_3$ typically require a range of voltages on the order of zero to several thousand volts typically can be applied to support an amount of $2\pi$ retardation, while liquid crystal and electro-optic polymer materials generally require a range of voltages less than 100 volts to achieve a similar range of retardation according to the principles of the present invention.

Retarder 140 optionally includes a section 135 of material that is not disposed between electrodes 125, 126. Typically, section 135 has a fixed birefringence characteristics and, thus, functions as a fixed optical retarder. Generally, the cumulative birefringent properties of section 135 provide a bias for optical signals propagating through retarder 140. More specifically, the birefringent characteristics of retarder 140 including section 135 can be adjusted to generate an appropriate gain profile for optical signals propagating through optical system 100. This will be discussed in more detail later in the specification.

As previously discussed, e and o components of the optical input signal can be adjusted via retarder 140 to produce components e' and o'. The latter optical components e' and o' are then recombined at combiner 180 to produce optical ray A', which is fed through collimator 185 to fiber cable 190. Thus, an optical input signal in fiber cable 110 can propagate through optical system 100 to fiber cable 190.

More details of related optical systems can be found in U.S. provisional application Ser. No. 60/081,011 filed on Apr. 8, 1998, U.S. provisional application Ser. No. 60/117, 386 filed on Jan. 27, 1999, U.S. application Ser. No. 09/158, 224 filed on Sep. 22, 1998, and PCT publication WO 99/67679, the entire teachings of all of which are incorporated herein by this reference.

Figure 2:
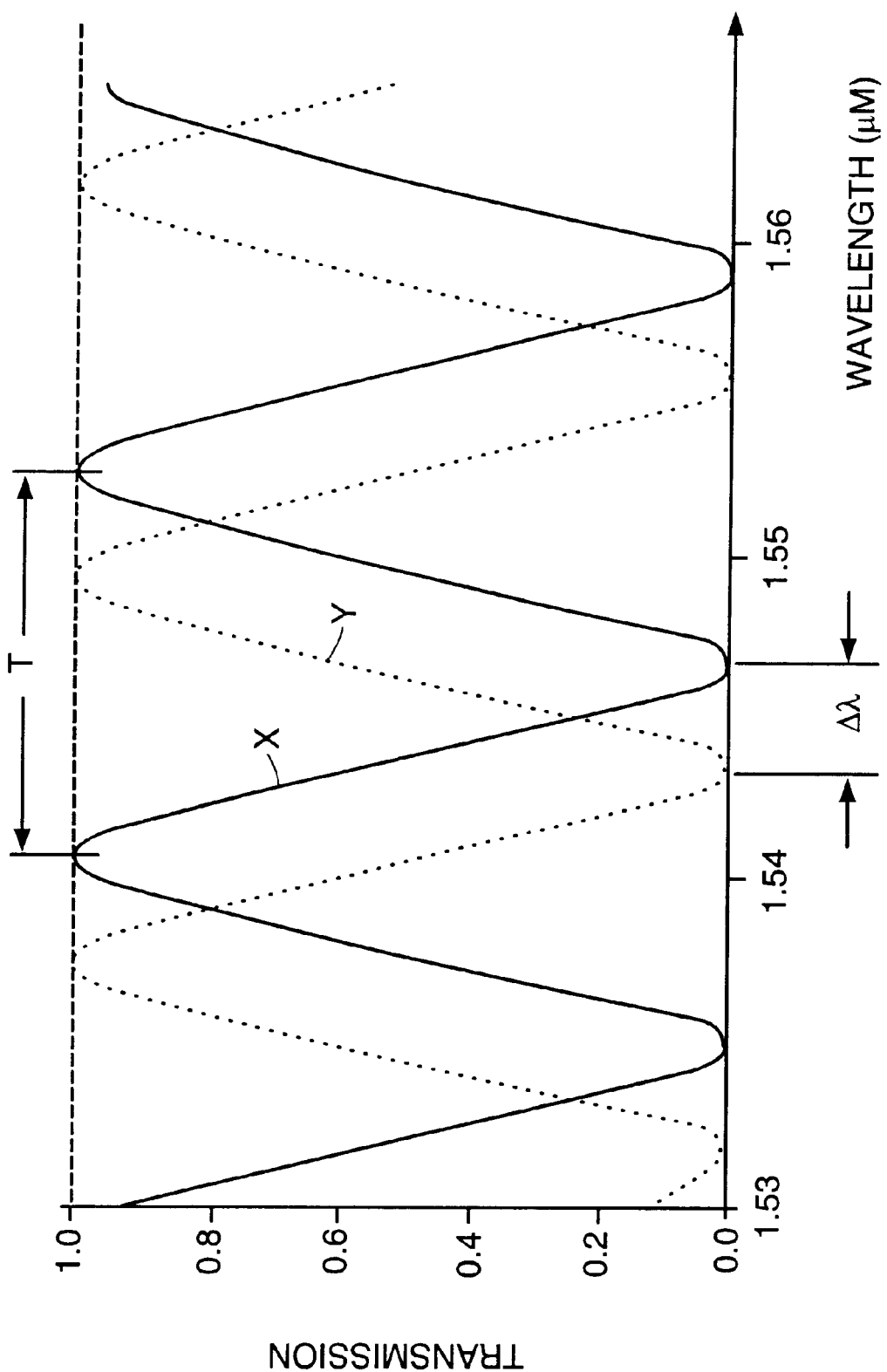
FIG. 2 is a graph of adjustable gain profiles according to certain principles of the present invention.

FIG. 2 is a graph illustrating a sample gain profile of optical system 100 according to certain principles of the present invention. The graph illustrates a degree to which an optical input signal can be attenuated over a range of wavelengths.

Consider the attributes of a gain profile illustrated by attenuation profile X. As shown, the attenuation across a range of wavelengths is defined by attenuation profile X, which is generally sinusoidal. A similar graph illustrating frequency versus transmission would be more sinusoidally shaped.

One aspect of the profile's shape depends on the cumulative birefringent properties of retarder 140. For instance, a period, T, of gain profile X across a specific range of wavelengths can be selected based upon a fabrication of section 135 that is used to provide a bias. A higher overall birefringence of retarder 140 results in a smaller period, T, of a corresponding attenuation profile. Conversely, a lower overall birefringence of retarder 140 results in a sinusoidal attenuation profile having a larger period, T. Consequently, the period, T, of the gain profile generally can be selected based upon the bias provided by section 135 and adjusted based upon a voltage applied across electrodes 125, 126.

Note that the shape of the attenuation profile as shown renders it possible to allow certain wavelengths to pass while other wavelengths propagating through optical system 100 are filtered. For instance, wavelengths of gain profile X having an optical transmission near 1.0 pass unattenuated through optical system 100 while those near 0.0 are almost completely attenuated by optical system 100. Thus, optical system 100 can be utilized as an optical bandpass filter.

One aspect of the present invention involves adjusting the phase of the gain profile. More specifically, an attenuation profile can be adjusted so that it appears to shift over a range of wavelengths. This is generally achieved by controlling a voltage applied across electrodes 125, 126 so that gain profile X shifts or changes by an amount of $\Delta\lambda$ to produce a new gain profile Y. In particular, the birefringent properties of retarder 140 are adjusted such that the components, namely e and o, of the optical input signal traveling along separate paths are adjusted to produce an optical output that is a filtered version of the optical signal depending on the attenuation profile defined by retarder 140. Consequently, characteristics of optical system 100 can be adjusted via an electronic input to provide high speed switching or compensation functions for optical signals.

In certain applications requiring a specific attenuation profile for a small range of wavelengths, a phase of the attenuation profile can be adjusted to provide more or less attenuation for a given range. For example, the fixed birefringence of the material in section 135 of retarder 140 can be reduced so that a sinusoidal attenuation profile has a longer period, T. A phase of the attenuation profile also can be adjusted so that a portion of the sinusoidal attenuation profile provides a proper attenuation for a given range of wavelengths. Thus, depending on the phase and period of the attenuation profile, a desired slope and offset of the attenuation profile can be selected by adjusting the voltage applied across electrodes 125, 126 to produce an appropriate filtered output for a range of wavelengths. In other words, sections of a sinusoidally shaped gain profile can provide a desired attenuation profile for a range of optical inputs. This is generally shown in FIGS. 7–10 and will be discussed in more detail later in this specification.

Figure 3:
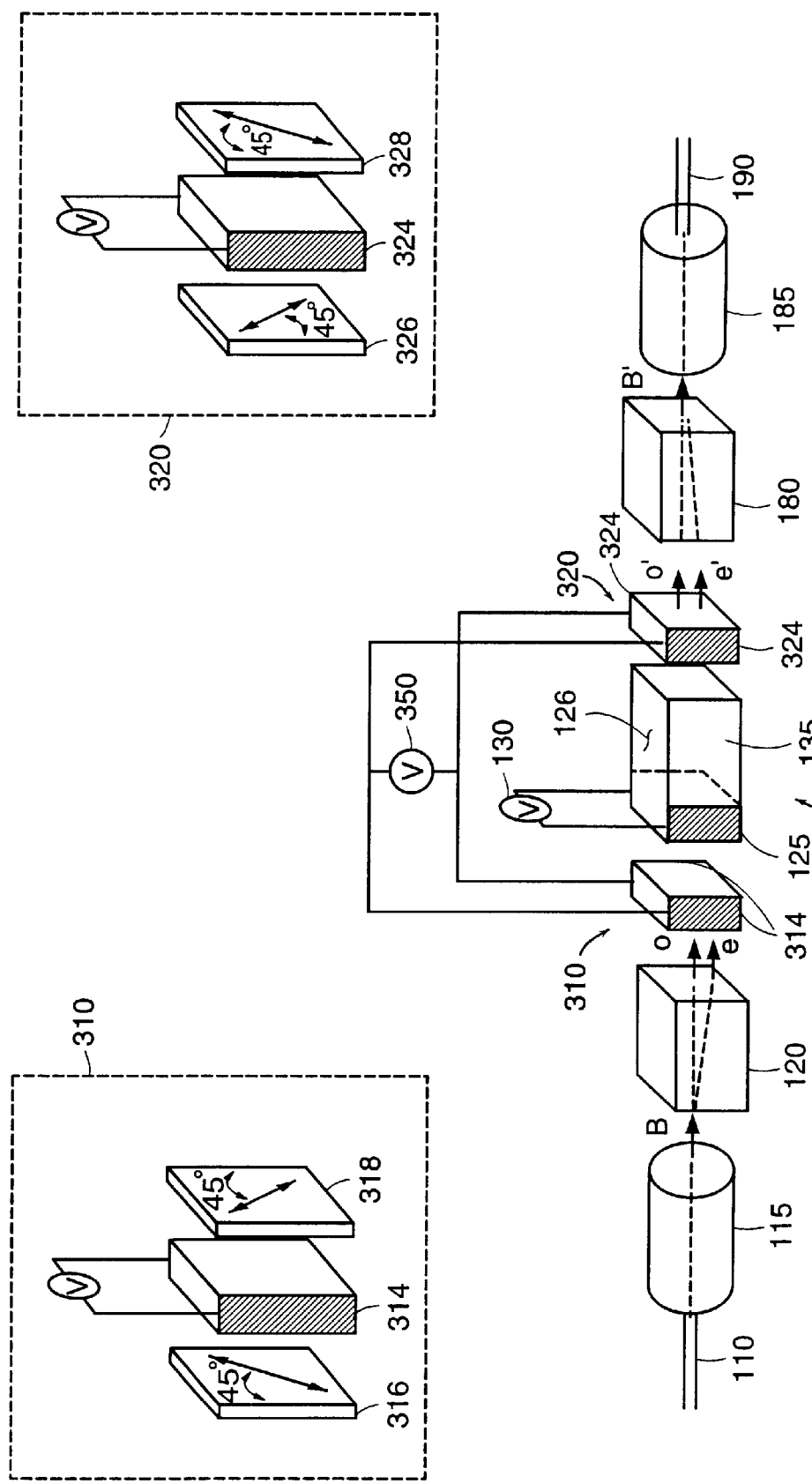
FIG. 3 is a pictorial diagram of an optical system including electro-optic rotator devices according to certain principles of the present invention.

FIG. 3 is an optical system for adjusting a gain profile according to certain principles of the present invention. Although similar to optical system 100 as shown in FIG. 1, optical system 300 as shown in FIG. 3 additionally includes optical components for adjusting amplitude characteristics of a corresponding gain profile.

Additional components such as first optical polarization rotator 310 can be positioned between beam splitter 120 and optical retarder 140 while second optical rotator 320 can be positioned between retarder 140 and optical combiner 180 as shown. Generally, electrode pair 314 is provided on rotator 310 to adjust components of the optical input traveling along separate paths such as optical input components of the e and o axis. In a similar manner to the principles as previously discussed for retarder 140, electrode pair 324 is provided on rotator 320 to adjust the components of the optical input traveling along separate paths.

Electro-optic rotators 310, 320 are typically block-shaped as shown and are fabricated from materials such as those previously described for retarder 140, i.e., PLZT, PMN and the like. Typically, rotators 310, 320 are positioned between a corresponding pair of quarterwave plates.

In an embodiment including rotators 310, 320 fabricated from a ceramic material, the slow-axis of first quarterwave plate 316 is positioned 45 degrees to the electrical field direction. The slow axis of the second quarterwave plate 318 is preferably positioned 45 degrees to the electric field and 90 degrees to the slow axis of the first quarterwave plate 316 as shown. Thus, quarterwave plates 316, 318 can be perpendicularly positioned with respect to each other. Typically, quarterwave plates 316, 318 are fabricated from crystalline materials such as Quartz, Sapphire or other suitable materials.

In a similar manner, rotator 324 can include another set of quarterwave plates 326, 328 fabricated from similar material. As shown, the slow axis of quarterwave plates 326, 328 are positioned perpendicular to each other.

While passing through a rotator device, the polarization direction of the light can be rotated an angle of half the retardation induced by the variable retardation.

In an embodiment where rotators 310, 320 are fabricated from a crystalline material, opposing quarterwave plates can be oriented so that slow (fast) polarization axis are aligned rather than oriented perpendicular to each other as previously discussed for the ceramic embodiment. Also, a voltage polarization of the electrodes is optionally reversed on rotator 324 to account for characteristics of a crystalline material. Thus, optical system 300 can be modified depending on use of materials according to certain principles of the present invention.

Corresponding pairs of electrodes 314 and 324 disposed on rotators 310, 320, respectively, can be parallel so that a uniform electric field is produced to adjust optical components traveling on separate paths through rotators 310, 320. A voltage such as a DC voltage can be applied across electrode pairs 314 and 324 via second voltage source 350. A common voltage provided by voltage source 350 is applied across both sets of electrodes disposed on rotators 310, 320 in the embodiment as shown.

One aspect of the embodiment shown in FIG. 3 involves adjusting the polarization components such as the orientation of e and o components traveling along separate paths. For example, the voltage applied by source 350 is adjusted so that incoming optical polarization components e and o through rotator 310 are rotated according to an applied electric field between electrode pair 314. Prior to recombination at combiner 180, the e and o components of the optical input signal are then rotated back to their original orientation via second rotator 320 to produce components e' and o'. Notably, second rotator 320 tilts the polarization of the e and o components in a direction opposite to that of the first rotator 310. For linear electro-optic material such as crystal, the connection to electrodes can be reversed to apply an electric field in the opposite direction. Another method is to adjust the slow axis orientation of the quarterwave plates by 90 degrees from the first rotator 310.

A degree to which components of the optical input are optically rotated affects the amplitude characteristics of the gain profile of optical system 300. For example, components of the optical input are rotated between first rotator 310 and second rotator 320 to attenuate the overall optical input signal to produce an optical output signal. As previously discussed, the birefringence of retarder 140 is at least partially controlled via source 130 to vary the phase characteristics of the gain profile.

Thus, according to certain principles of the present invention, both the amplitude and phase characteristics of a gain profile can be adjusted to produce a desired output using minimal power. For example, rotators 310, 320 and retarder 140 require minimal current to provide an electric field across corresponding electrodes. Also, the electric fields in rotators 310, 320 can be switched at high rates since they are electronically controlled.

It should be noted that a rotator device such as rotator 310 or rotator 320 can be used as an individual optical component in a variety of applications. For instance, a rotator device comprising quarterwave plates 316, 318 and adjustable birefringent material disposed between electrode pair 314 can be used to adjust an optical signal in a PM (Polarization Maintaining) fiber. A first PM fiber can be positioned to direct an optical signal through a rotator device for adjusting characteristics of the optical signal transmitted to a second PM fiber positioned to receive an output signal of the rotator. Accordingly, a voltage applied to corresponding electrodes of a the rotator device can adjust optical properties of a passing optical signal as previously discussed.

Figure 4:
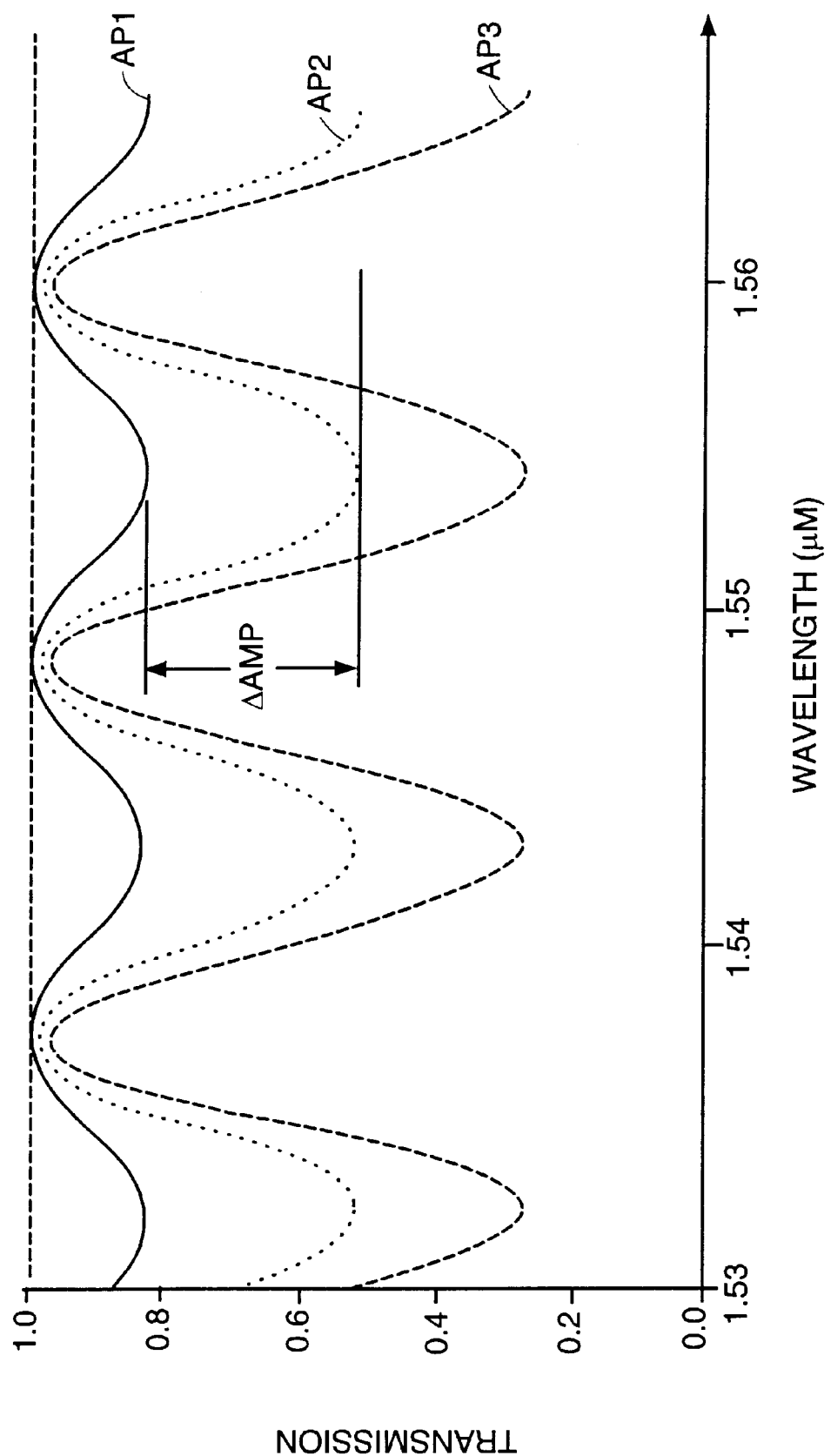
FIG. 4 is a graph illustrating adjustable gain profiles according to certain principles of the present invention.

FIG. 4 is a graph illustrating sample gain profiles according to certain principles of the present invention. As shown, amplitude characteristics of the attenuation profile can be adjusted over a range of wavelengths. Accordingly, the graph illustrates a degree to which an optical input signal can be attenuated.

Consider the attributes of a gain profile as illustrated by attenuation profile, AP1. Generally, the attenuation across a range of wavelengths is sinusoidal. As previously discussed, a shape of the gain profile depends on the cumulative birefringent properties of retarder 140. For instance, a period (T) of gain profile AP1 can be selected based upon the overall birefringence of retarder 140.

Note that the shape of the attenuation profile as shown renders it possible to allow certain wavelengths to pass while other wavelengths propagating through optical system 300 are attenuated. Thus, optical system 300 can be utilized as an optical bandpass filter.

Another aspect of the present invention involves adjusting amplitude characteristics of a gain profile to control an optical input as previously discussed. This is generally achieved by controlling a voltage supplied by source 350 and corresponding voltages applied across electrode pairs 314 and 324. Based on the applied voltage of source 350, attenuation profile AP1 shifts by an amount of Δamp to produce a new attenuation profile AP2. In particular, the polarization characteristics of components traveling along the e and o axis are rotated such that the components, namely e and o, of the optical input signal traveling along separate paths are adjusted to produce a desired optical output. Consequently, filter characteristics of optical system 300 can be adjusted via an electronic input to provide even more sophisticated hi speed switching or multiplexing functions than discussed for optical system loo as illustrated in FIG. 1.

Figure 5:
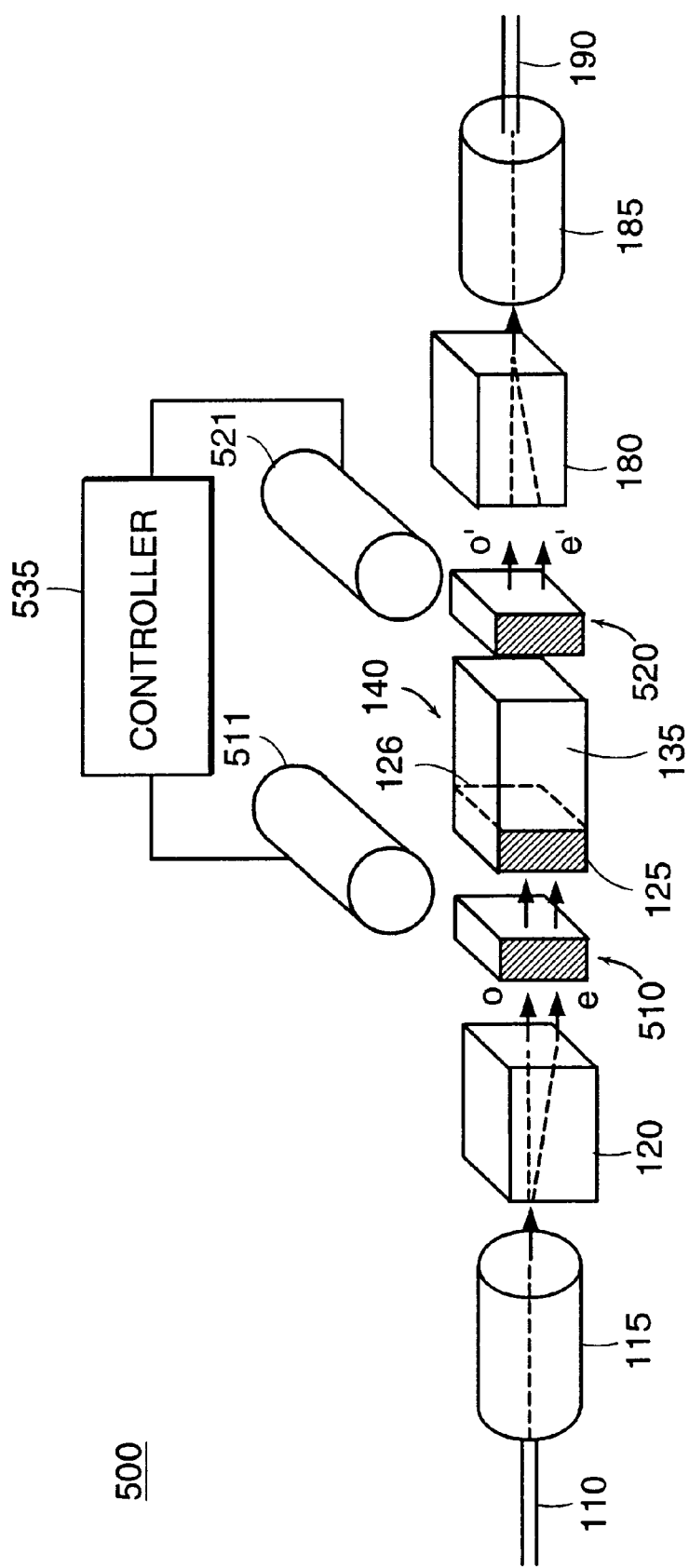
FIG. 5 is a pictorial diagram of an optical system including magnetically controlled optical rotator devices according to certain principles of the present invention.

FIG. 5 is an optical system for adjusting a gain profile according to certain principles of the present invention. Although similar to optical system 300 as shown in FIG. 3, optical system 500 as shown in FIG. 5 utilizes substitute optical components for adjusting amplitude characteristics of a corresponding gain profile.

Substitute components such as first Faraday rotator 510 fabricated from, for example, Bismuth substituted YIG (Yttrium-Iron Garnet), can be positioned between beam splitter 120 and retarder 140. Second Faraday rotator device 520, preferably fabricated from the same material as first Faraday rotator device 510, can be positioned between retarder 140 and optical combiner 180 as shown.

Generally, electromagnetic devices 511 and 521 are used in conjunction with rotator devices 510 and 520, respectively, to adjust components of the optical input traveling along separate paths such as e and o components. Controller 535 controls current through windings of magnetic devices 511 and 521 so that the polarization of components of the optical input signal e and o are properly rotated as they pass through rotator devices 510 and 520.

The principles of tilting the polarization axis of the optical input signal are similar to those previously discussed for FIG. 3. However, magnetically-controlled rotator devices 510, 520 are used instead of electro-optic rotators 310, 320. Amplitude characteristics of a gain profile can be adjusted to produce a filter by controlling features of optical system 500 such as rotator devices 510, 520 and corresponding magnetically controlled devices 511, 521.

Figure 6:
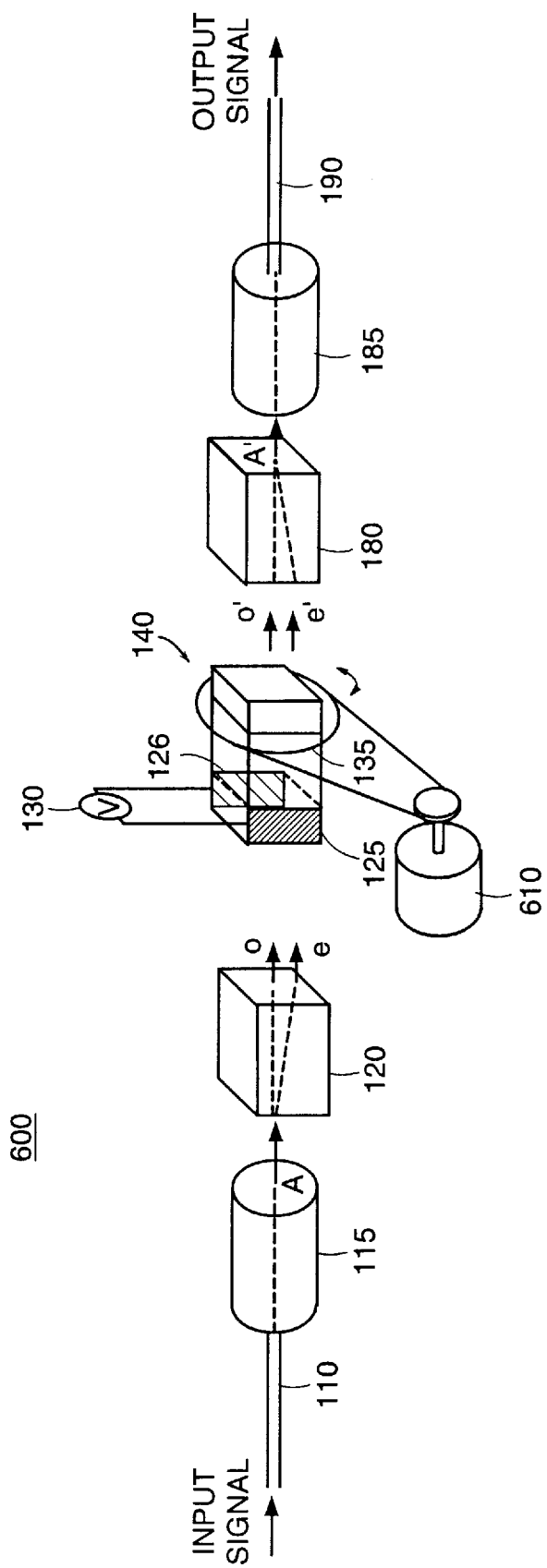
FIG. 6 is a pictorial diagram of an optical system including a physically rotating optical retarder device according to certain principles of the present invention.

FIG. 6 is yet another optical system for adjusting a gain profile according to certain principles of the present invention.

In the embodiment as shown, actuator 610 is provided to rotate retarder 140 about a lengthwise axis along which optical components travel. Rather than tilting the polarization of optical input components using optical rotator devices as previously discussed, retarder 140 is physically rotated to achieve the same effect using actuator 610. Thus, amplitude characteristics of a gain profile for optical system 600 can be adjusted based on the physical orientation of retarder 140.

Generally, a gain profile will be flat (no attenuation across a range of wavelengths) when the orientation angle of a fast (slow) axis of retarder 140 is at an integer number of 90 degrees with respect to the polarization axis of the e and o components. Conversely, attenuation will be maximized for an attenuation profile when retarder 140 is positioned at an odd integer of 45 degrees as previously discussed.

FIGS. 7–10 are graphs of sample attenuation profiles according to certain principles of the present invention. A gain profile as illustrated can be adjusted based on the techniques as previously discussed so that an optical input signal is attenuated appropriately across a range of wavelengths. In certain applications, a portion of a sinusoidally shaped attenuation profile can be selected to attenuate an optical input signal. Consequently, any profile can be selected for attenuating an input signal over a selected range of wavelengths. A profile as illustrated in each graph can be produced by applying an appropriate voltage across electrodes of rotator device and retarder 140.

Figure 7:
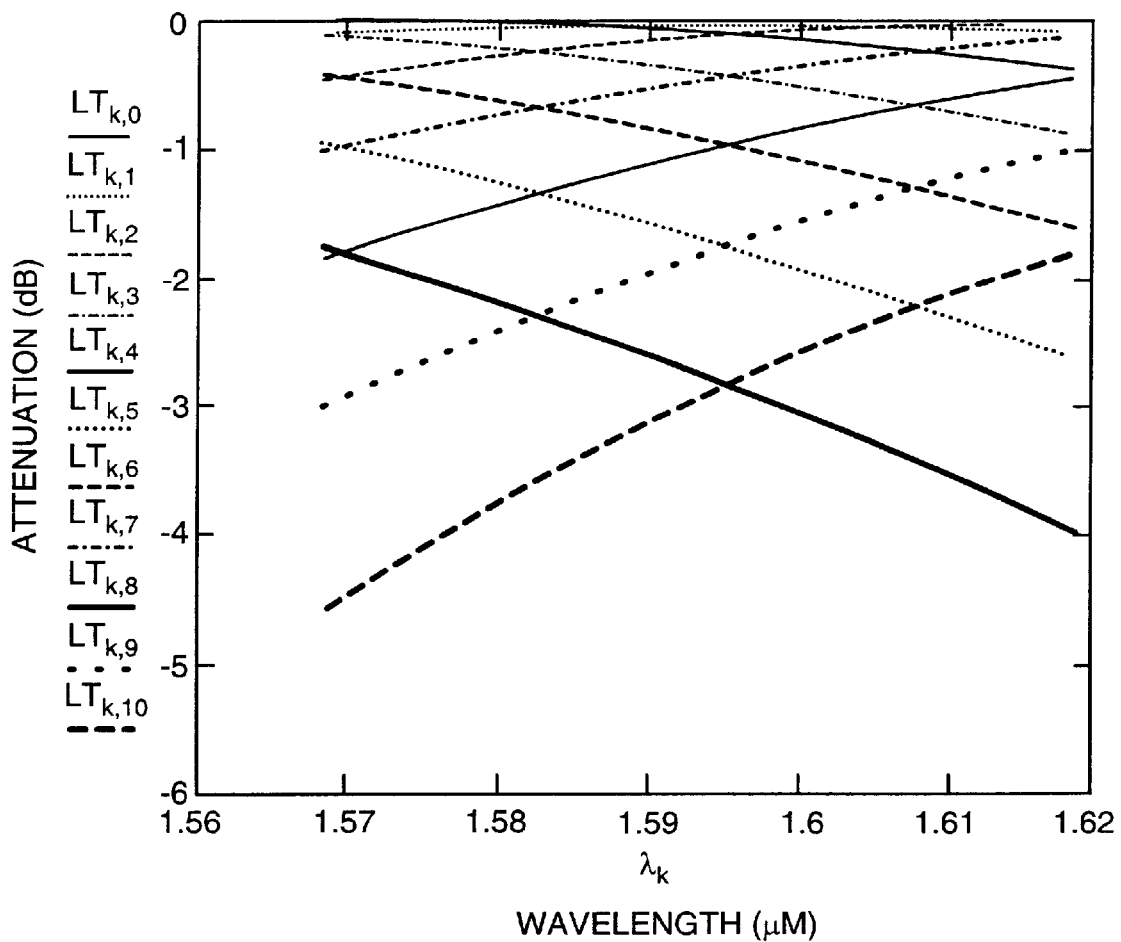
FIG. 7 is a graph illustrating gain profiles for a range of wavelengths according to certain principles of the present invention.

FIG. 7 is a graph illustrating gain profiles versus applied control voltages of an optical system for L-band wavelengths ranging from 1.560 micrometers to 1.620 micrometers according to certain principles of the present invention.

Figure 8:
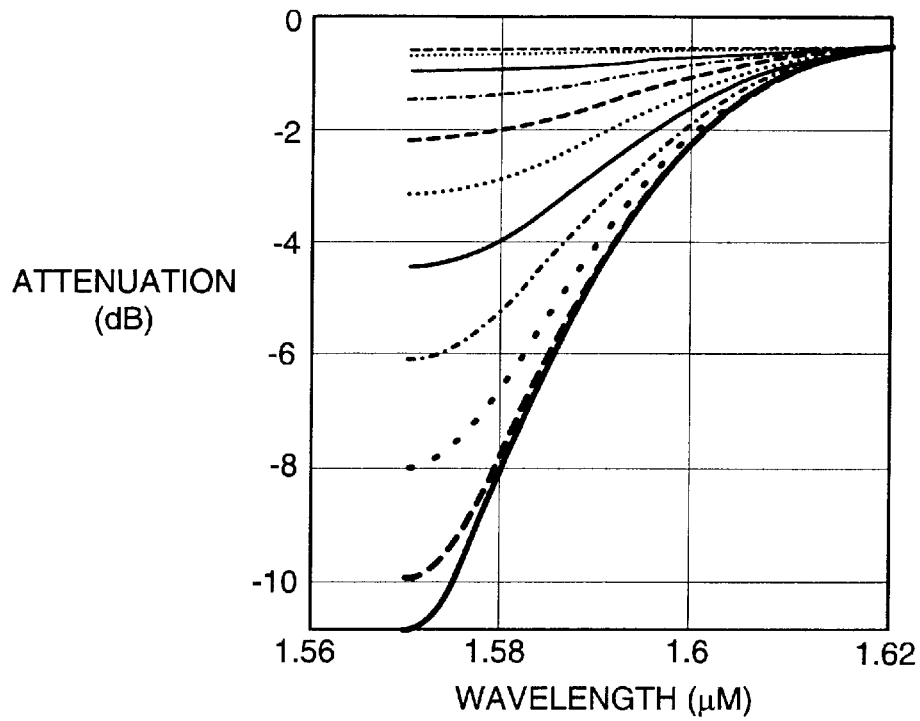
FIG. 8 is a graph illustrating gain profiles for a range of wavelengths according to certain principles of the present invention.

FIG. 8 is a graph illustrating a gain profile of an optical system for L-band wavelengths ranging from 1.560 micrometers to 1.620 micrometers according to certain principles of the present invention.

Figure 9:
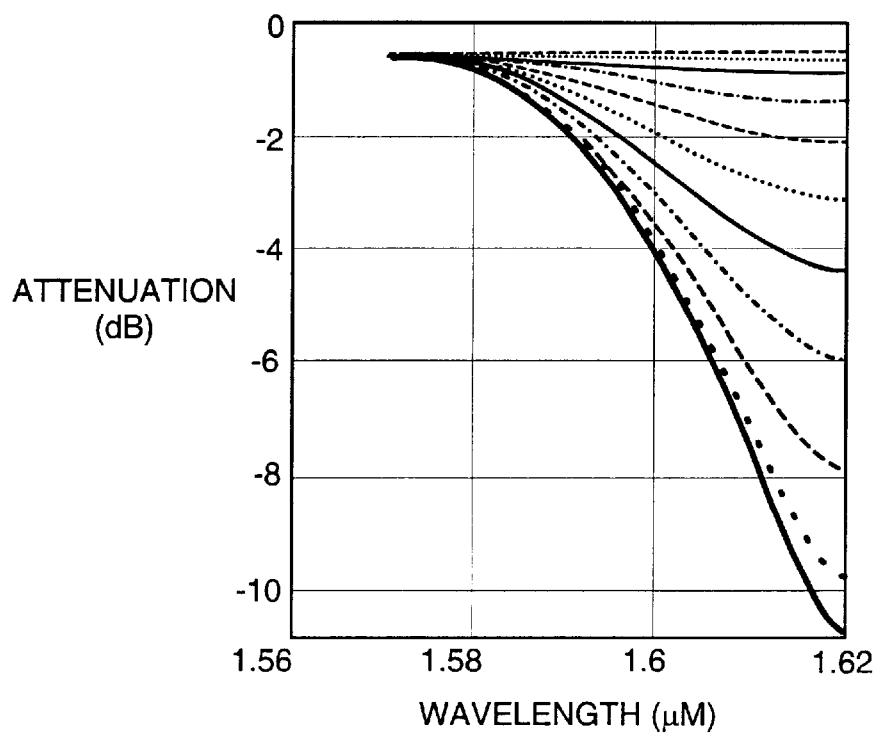
FIG. 9 is a graph illustrating gain profiles for a range of wavelengths according to certain principles of the present invention.

FIG. 9 is a graph illustrating a gain profile of an optical system for L-band wavelengths ranging from 1.560 micrometers to 1.620 micrometers in which a retardation bias of 25 microns is imparted by fixed retarder and 0.4 microns by variable retarder according to certain principles of the present invention.

Figure 10:
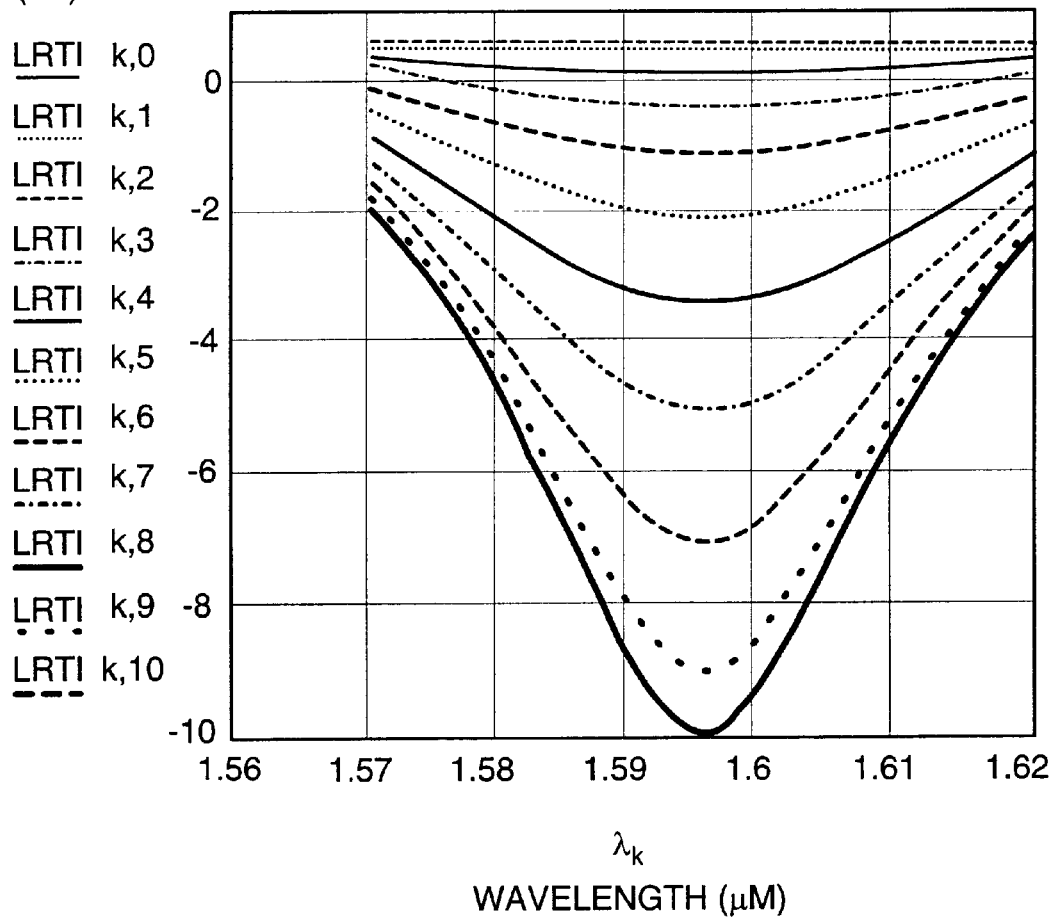
FIG. 10 is a graph illustrating gain profiles for a range of wavelengths according to certain principles of the present invention.

FIG. 10 is a graph illustrating a gain profile of an optical system for L-band wavelengths ranging from 1.560 micrometers to 1.620 micrometers in which a retardation bias of 25 microns is imparted by fixed retarder and 0.8 microns by variable retarder according to certain principles of the present invention.

Figure 11:
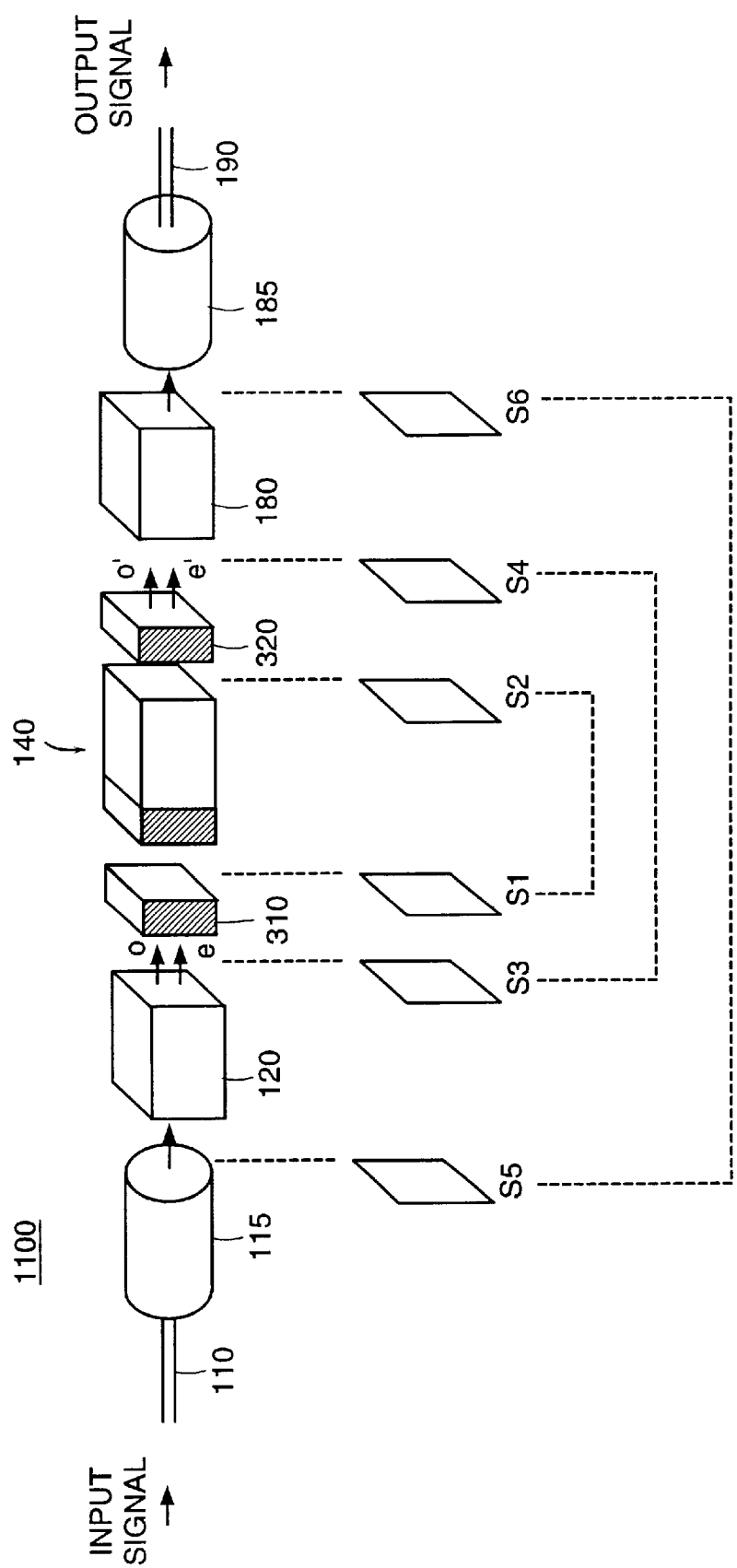
FIG. 11 is a pictorial diagram of an optical system including reflective surfaces according to certain principles of the present invention.

FIG. 11 is a block diagram of an optical system including reflective surfaces to form one or more etalons according to certain principles of the present invention. Although similar to optical system 300 as shown in FIG. 3, optical system 1100 as shown in FIG. 11 potentially includes pairs of reflective surfaces S1–S6 to form corresponding etalons.

Typically, reflective surfaces are partially reflective such as a mirror produced by a thin coating of reflective material. However, any type of reflective surface can be used to reflect an optical signal of optical system 1100.

Generally, an etalon can be formed in optical system 1100 via the placement of reflective surfaces S1, S2, S3, S4, S5 and S6 at various location. For example, a pair of reflective surfaces S1 and S2 can be provided on exposed surfaces at an axial end of retarder 140. Preferably, the reflective surfaces are fabricated so that they are parallel to each other.

In a similar manner, reflective surface pair S3 and S4 can be provided on exposed surfaces of optical rotators 310, 320 to form a second etalon. Further, another pair of reflective surfaces such as S5 and S6 can be disposed on outer surface of beam splitter 120 and combiner 180 to form yet another etalon.

Pairs of reflective surfaces are typically spaced at a fixed distance apart and, in certain applications, the reflective surface pairs are spaced depending on a wavelength of light that is to be reflected. As discussed, the reflective surfaces can be fabricated so that a pair of electrodes is parallel with each other.

Figure 12:
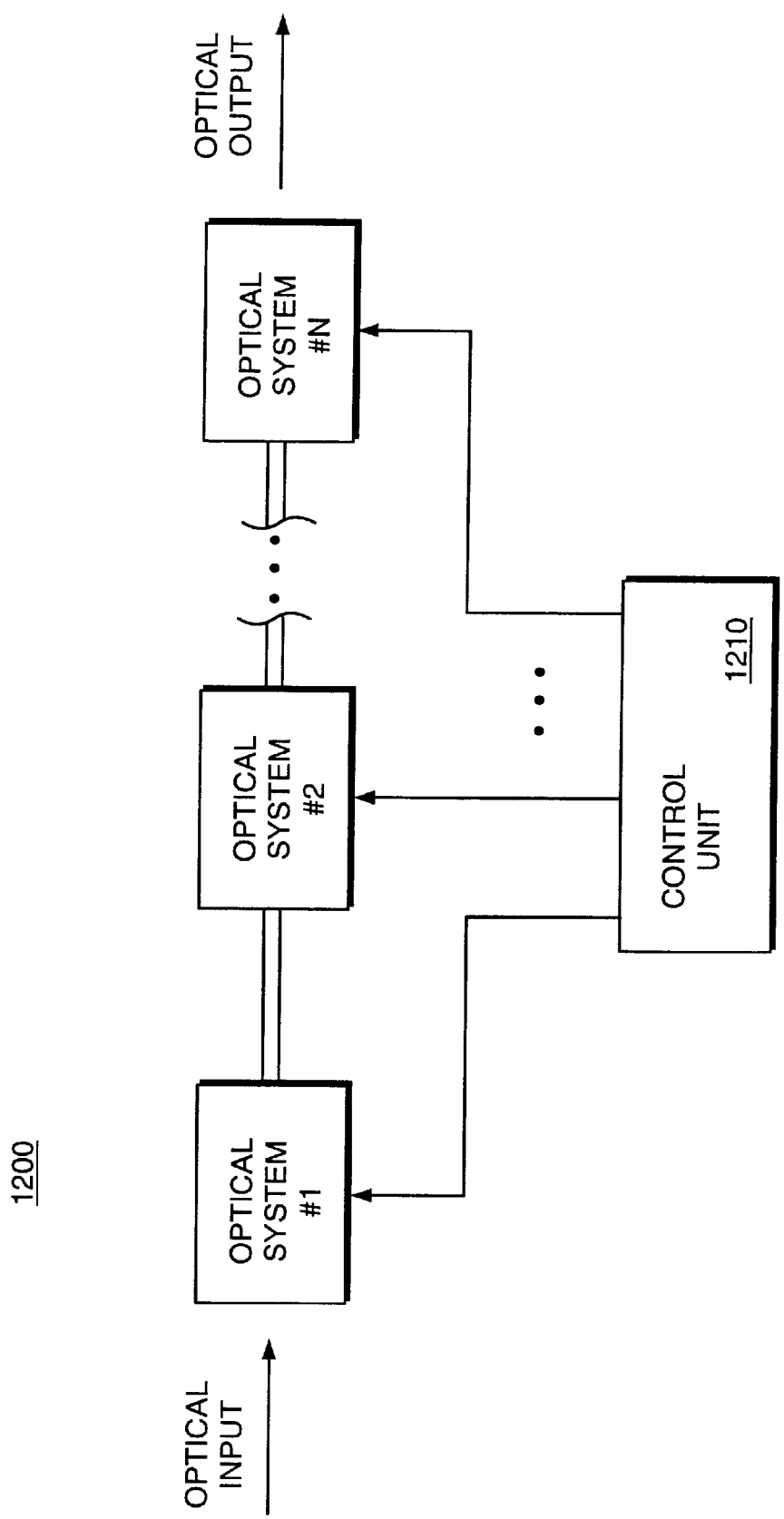
FIG. 12 is a block diagram of a multi-stage optical system for filtering an optical signal according to certain principles of the present invention.

FIG. 12 is a block diagram of an optical system including multiple stages according to certain principles of the present invention. Generally, multiple filter stages are controlled to provide a desired overall gain profile for attenuating optical signals.

As shown, an optical input signal is fed into optical system #1. Based upon settings supplied by control unit 1210, optical system #1 is controlled to provide a specific gain profile. The optical output of system #1 is then fed into a successive stage, namely optical system #2, which itself is controlled to provide a desired gain profile. This is repeated so that the optical input signal is transmitted through the multiple stages of optical systems #1 through N.

It should be noted that any combination of optical systems as previously discussed can be used to fabricate a multi-stage optical filter as shown in optical system 1200. For example, optical system #1 can comprise optical system 300 as shown in FIG. 3. Each filter stage can be identical such as that of optical system 300 or variety of different optical systems can be serially positioned to provide an overall profile for attenuating an optical input.

By dynamically setting an attenuation profile of each successive stage via control unit 1210, any overall attenuation profile can be selected for optical system 1200. Thus, one aspect of the present invention involves tuning multiple optical channels via a selected gain profile. Since individual gain profiles provided by each stage are superimposed upon each other, almost any gain profile can be supported by optical system 1200 by properly shaping an attenuation profile of each filter stage.

Figure 13:
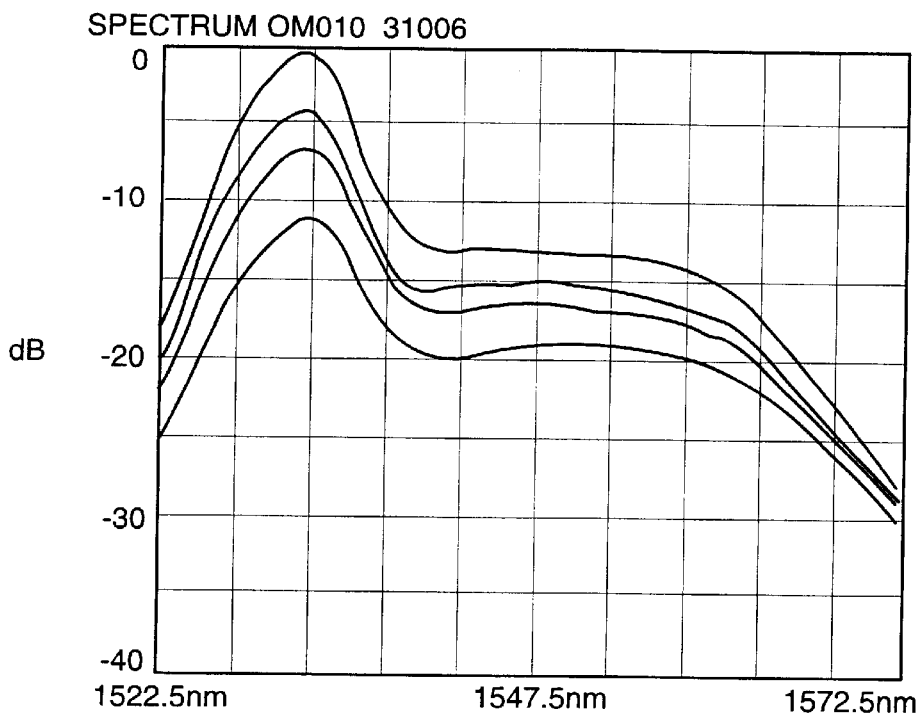
FIG. 13 is a graph illustrating uneven spectral profiles according to certain principles of the present invention.

One application of the present invention is a multi-stage filter that is used to adjust a spectral profile of an EDFA (Erbium Doped Fiber Amplifier) optical signal. FIG. 13 is a graph of a sample spectral profile of an optical input signal of an EDFA system having different amplifications across a range of wavelengths according to certain principles of the present invention.

As shown, optical wavelengths at a lower end of the spectrum are minimally attenuated while those at a higher end of the spectrum are more severely attenuated. Ideally, the spectrum would be flat across a range of wavelengths, but components of an optical system such as a fiber cable or amplifier can distort optical input signals depending on wavelength. For example, an optical component such as a fiber cable or Raman Amplifier can distort optical signal power levels over a range of wavelengths so that they are no longer flat. An embodiment of the present invention can be used as a dynamic gain flattening filter to adjust these and other types of optical signals.

Figure 14:
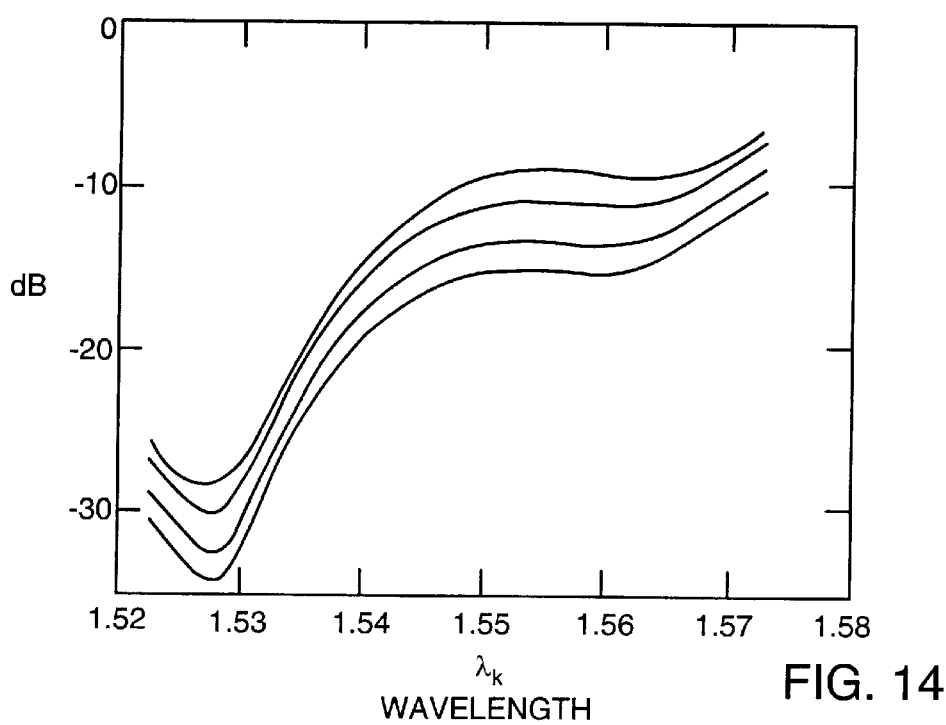
FIG. 14 is a graph of overall gain profiles for flattening a spectral profile of optical signals over a range of wavelengths according to certain principles of the present invention.
Figure 15:
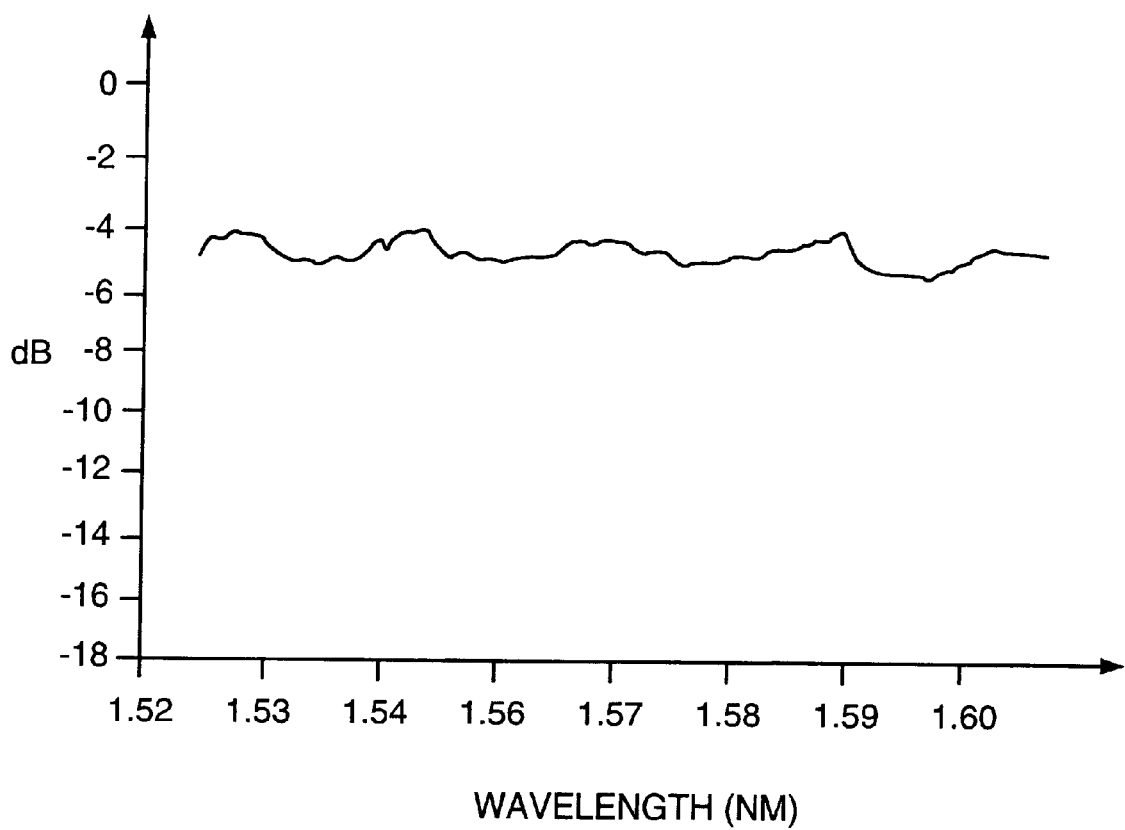
FIG. 15 is a graph illustrating a spectral profile of an optical output signal that has been flattened according to certain principles of the present invention.

FIG. 14 is a graph illustrating sample gain profiles for flattening optical input signals according to certain principles of the present invention. An overall sample gain profile such as that of optical system 1200 as shown in FIG. 14 can be selected to flatten the spectral profile of the optical input signal as shown in FIG. 13. More specifically, the optical input signal as shown in FIG. 13 can be fed into optical system 1200 having a gain profile as shown in FIG. 14, so that the spectral profile of an optical output signal is generally flat across a range of wavelengths as shown in FIG. 15. A flattened output profile can be beneficial in applications where a parameter such as a signal to noise ratio should be constant across multiple optical channels.

Figure 16:
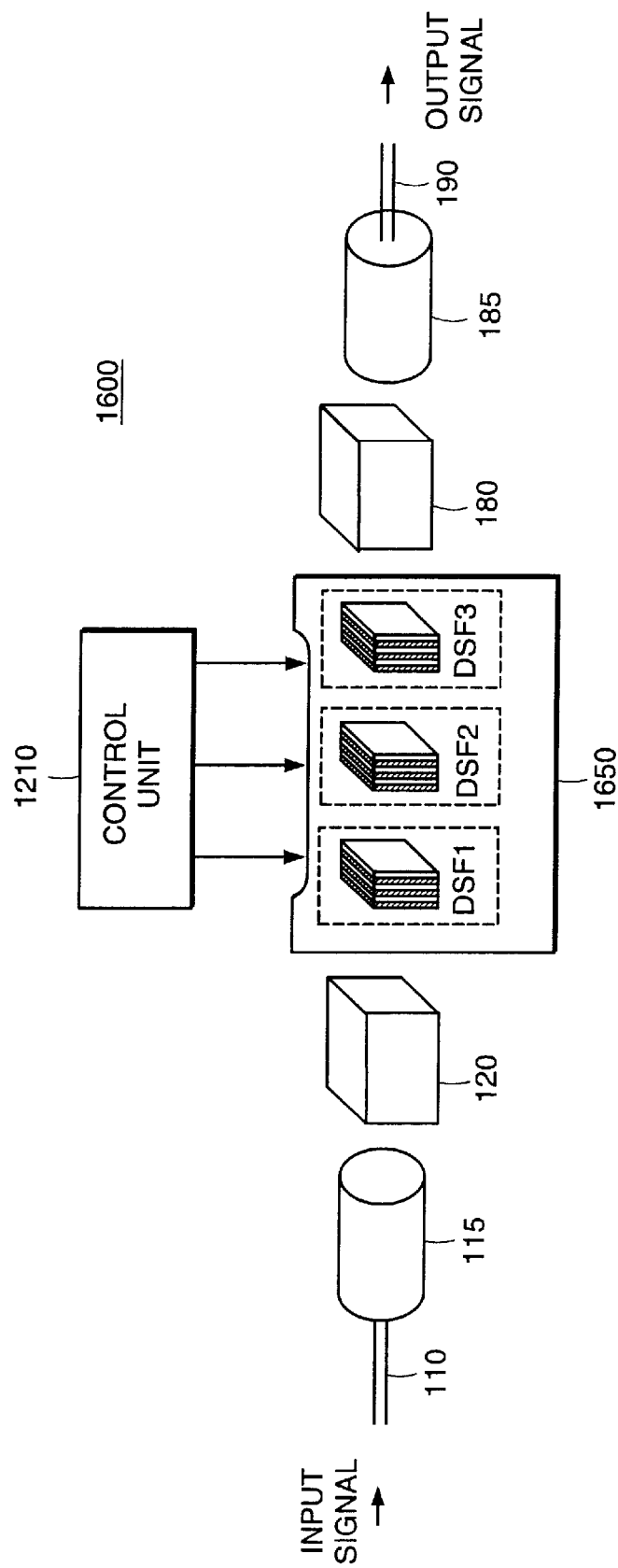
FIG. 16 is an optical system including multiple adjustable filter stages according to certain principles of the present invention.
Figure 17:
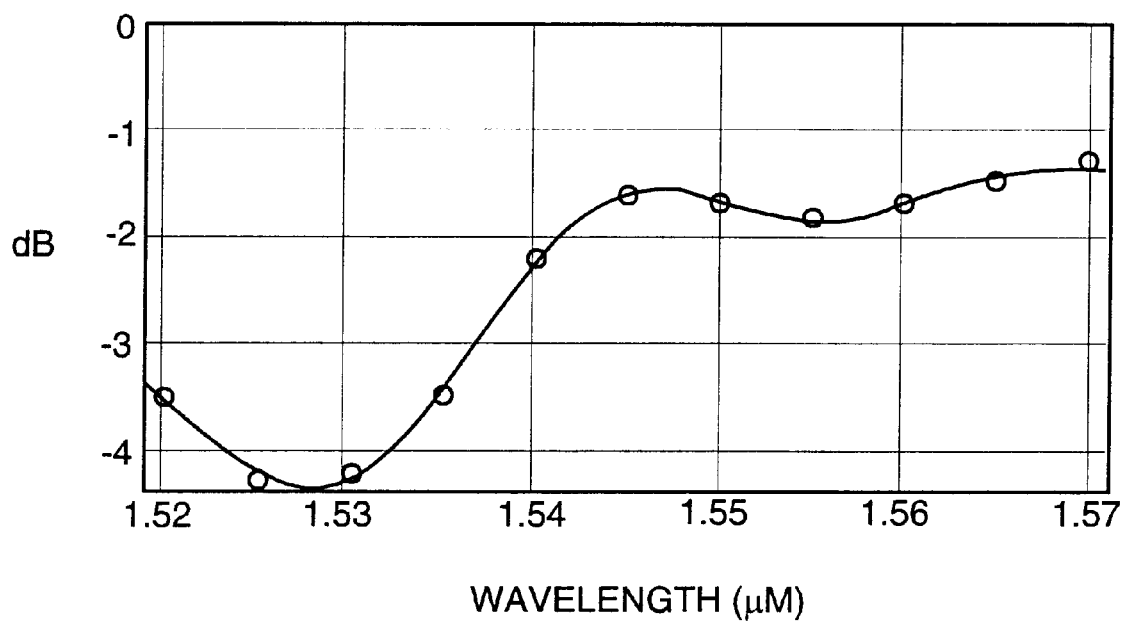
FIG. 17 is a graph illustrating a sample gain profile according to certain principles of the present invention.

FIG. 16 is a block diagram of an optical system according to certain principles of the present invention. In addition to the optical components as previously discussed, optical system 1600 can include multiple dynamically controlled sinusoidal filter stages 1650 such as DSF1, DSF2, and DSF3. Any number of filter stages can be included in optical system 1600 and each filter stage can include an optical retarder and corresponding rotator devices. Consequently, voltages applied to corresponding electrodes of each stage as supplied by control unit 1210 can be adjusted to select an overall attenuation profile such as that shown in FIG. 17.

Figure 18:
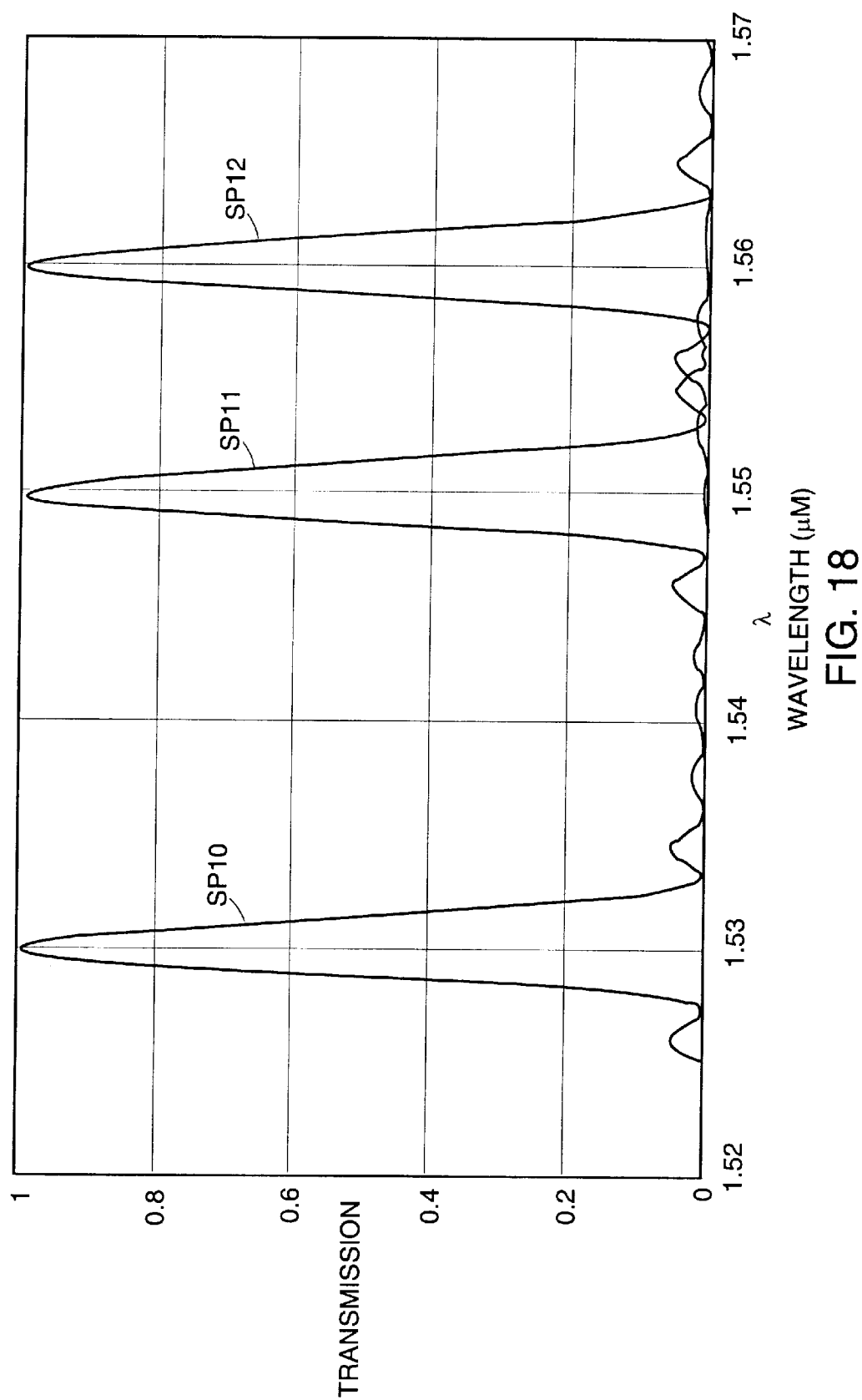
FIG. 18 is a graph illustrating multiple potential gain profiles according to certain principles of the present invention.

FIG. 18 is a graph of multiple spectral profiles settings of an optical system according to certain principles of the present invention. An optical system as previously discussed including four stages can be adjusted to produce an optical bandpass filter. For example, an attenuation profile of four filter stages can be individually set so that the overall gain profile of a corresponding optical system is that shown by spectral profile SP10 of FIG. 18. Thus, optical system 1600 can be adjusted to allow certain wavelengths of an optical input signal to pass while filtering others.

As shown, SP10 generally allows a, narrow band of wavelengths around 1.53 $\mu$m (micrometers) to pass through filter 1650 unattenuatted. Accordingly, an optical channel defined by a wavelength near 1.53 $\mu$m for carrying data information can pass through multi-stage optical filter system 1600. Similarly, SP11 and SP12 support an optical bandpass profile around 1.55 $\mu$m and 1.56 $\mu$m, respectively.

Figure 19:
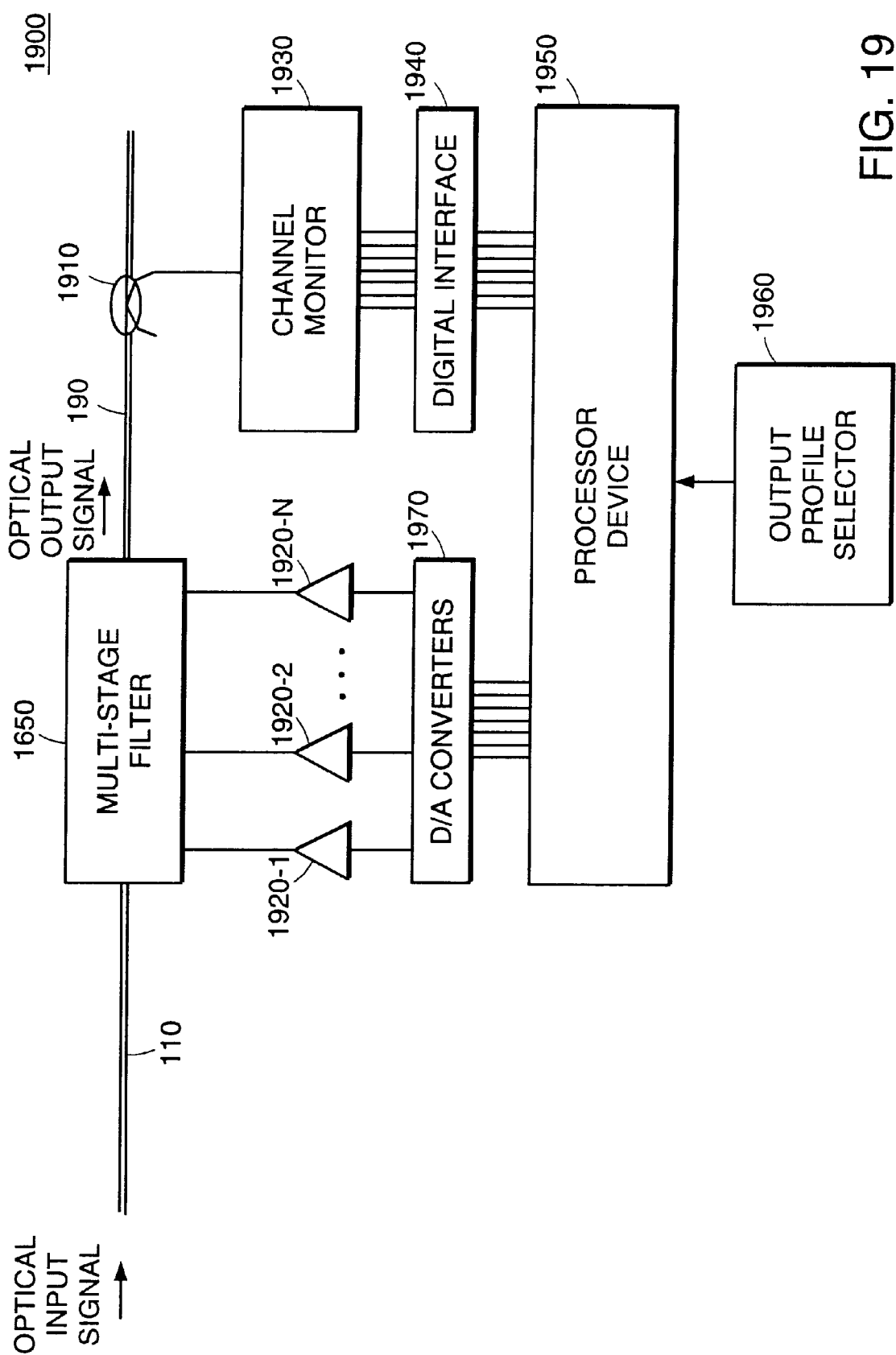
FIG. 19 is a block diagram illustrating an optical system for adjusting an output signal according to certain principles of the present invention.

FIG. 19 is a block diagram of an optical system incorporating feedback according to certain principles of the present invention. Generally, an optical signal is monitored to adjust characteristics of multi-stage optical filter 1900.

As shown, an input signal travels through fiber 110 to multi-stage filter 1650, which typically includes optical components and/or systems as previously discussed. The received optical signal from fiber 110 is filtered to produce output signal transmitted on fiber 190. Fiber tap 1910 along fiber 190 is provided so that a portion of optical output signal is redirected towards channel monitor 1930 such as an Optical Spectrum Analyzer (OSA). Typically, 1% to 5% of the optical signal in fiber 190 is fed into channel monitor 1930 for analysis. Based on this topology, one aspect of the present invention involves adjusting a spectral response of multi-stage filter 1650 in real time.

As its name suggests, channel monitor 1930 can be used to monitor received power levels of optical signals present at each of multiple wavelengths. Typically, the optical signals are analyzed and information such as wavelength versus detected power level is digitally encoded and transmitted through digital interface 1940 to processor device 1950. Generally, measured parameters of an optical output signal are transferred from channel monitor 1930 to processor 1950.

When desired, a compact channel monitor 1930 can be beneficially used in space restricted applications. In one application, channel monitor 1930 is Model OPM/OCM manufactured by Axsun.

A desired spectral response of multi-stage filter 1650 or a spectral profile optical output signal in fiber 190 can be provided by output profile selector 1960. Typically, a spectral profile or format is selected based on a digitally encoded selector input signal from selector 1960. Such a signal can indicate a desired power level setting for one or of multiple wavelengths of the optical output signal across a selected spectrum. Processor device 1950 can include an algorithm to modify the characteristics of multi-stage filter 1650 to produce a desired optical output into fiber 190. It should be noted that an output profile is optionally selected based on one or multiple analog inputs from selector 1960.

Generally, the input selector signal from selector 1960 can be a real-time signal, a signal stored in memory, or data information that is transmitted to processor device 1950 via one or multiple data packets.

In one application, processor device 1950 is a DSP (Digital Signal Processor) device including an internal bus, interrupt controller, and timer logic.

As mentioned, a spectral profile of the monitored optical signal can be converted into a digital format for analysis by processor device 1950 such as a Digital Signal Processor (DSP). A spectral profile of the optical signal in fiber 190 is compared to a selected or desired output profile. For example, segment or bands of the optical signal are compared to that of a desired optical output profile. An analysis within each of multiple spectral segments can yield a difference function for adjusting an overall attenuation profile of multi-stage filter 1650 so that it is optimized to produce a desired optical output. A best fit shape of the attenuation profile of multi-stage filter 1650 can be based on power or log power, depending on a selected algorithm.

Characteristics such as the response of the multi-stage filter 1650 can be maintained within processor device 1950 or related circuitry so that processor device can set filter 1650 appropriately for a given input. For instance, an algorithm of processor device 1950 can determine a voltage to be applied to corresponding electrodes of filter 1650 to produce an appropriate gain profile. Accordingly, a response of filter 1650 can be adjusted for producing a desired optical output signal into fiber 190.

As shown, an output signal for selecting an attenuation profile of processor device 1950 can be fed to an array of D/A converters 1970. Each D/A converter drives one of multiple amplifiers 1920-1, 1920-2, . . . , 1920-n that converts a lower voltage signal such as between 0 and 4 volts to a higher voltage signal between 0 and 400 volts for driving corresponding electrodes of multi-stage filter 1650. Thus, according to the principles of the present invention, a response of filter 1650 is adjusted to produce an appropriate optical output signal of fiber 190.

In certain applications, a process of adjusting an optical output is an iterative process. For example, characteristics of filter 1650 are initially adjusted based on a comparison of the optical output signal with a desired optical output profile. In a following compare cycle, the optical output signal of fiber 190 is again compared to a desired profile to further adjust parameters of filter 1650. This process can be repeated continuously so that the response of filter 1650 produces a desired optical output. Typically, a response time for setting parameters based on an output of filter 1650 is on the order of ten microseconds per iteration. However, an optimal iteration time may depend on a particular application.

Based on this aspect of repeatedly adjusting a gain profile to produce a desired optical output signal, a desired optical output signal can be produced in fiber 190 even though the optical input changes over time. That is, feedback is provided to adjust filter 1650, accounting for changes in the input signal.

An additional tap can be provided along fiber 110 for feeding a portion of optical input signal to channel monitor 1930. Similar to the methods previously discussed, the optical input signal can be monitored so that filter 1650 produces an appropriate optical output into fiber 190 based on an analysis of the optical input signal of filter 110.

In a specific application, channel monitor 1930 can include multiplexor circuitry for selecting whether the optical input signal or optical output signal is monitored by channel monitor 1930. Optionally, channel monitor 1930 includes resources for monitoring power of both the optical input and output signal simultaneously. In either case, a ratio of output power to input power can then be compared wavelength by wavelength over a given band to produce a desired output.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for filtering light comprising:
   a beam splitter that splits an optical input into polarization components along separate optical paths;
   a first electro-optic device that receives the polarization components of the optical input along separate paths, the first electro-optic device including electrodes across which a first voltage is applied to adjust a corresponding wavelength transmission characteristic of the device having an attenuation profile for filtering the optical input wherein the attenuation profile is approximately sinusoidal over a range of wavelengths, a first section of the first electro-optic device positioned between the electrodes having an adjustable birefringence depending on the applied first voltage, wherein phase characteristics of the attenuation profile are adjusted based on the first voltage applied across the electrodes in the first section of the first electro-optic device and a second section of the first electro-optic device positioned to receive optical components along the separate optical paths including a material having a fixed birefringence for providing an optical bias for determining a period, T, of the corresponding wavelength transmission characteristic of the device, wherein the adjustable birefringence of the first section positioned between the electrodes is adjusted depending on the applied first voltage to select a wavelength shift of the corresponding wavelength transmission characteristic of the device; and
   an optical combiner that combines the optical components transmitted along separate optical paths through the first electro-optic device to produce a filtered optical output based on the sinusoidal attenuation profile due to the first and second sections.

2. An apparatus as in claim 1, wherein the voltage applied across the electrodes of the first section of the first electro-optic device changes a phase difference of the optical components transmitted along separate paths such that the optical input is attenuated at selected wavelengths based on the sinusoidal attenuation profile when the optical components are combined to produce the optical output.

3. An apparatus as in claim 1, wherein the first section of the first electro-optic device is chosen from the group comprising PLZT, PMN, PMN-PT, PLMNT, $LiNbO_3$, and $LiTaO_3$.

4. An apparatus as in claim 1, wherein the first section of the first electro-optic device includes a polymer material.

5. An apparatus as in claim 1 further comprising:
a Faraday rotator and a corresponding electro-magnet device.

6. An apparatus as in claim 1 further comprising:
a second electro-optic device positioned to receive the optical components transmitted along separate paths, the second electro-optic device including electrodes across which a second voltage is applied to adjust a polarization orientation of the optical components.

7. An apparatus as in claim 1, wherein the first section of the first electro-optic device is a solid state device.

8. An apparatus as in claim 1, wherein the first section of the first electro-optic device is fabricated from a ceramic material.

9. An apparatus as in claim 1, wherein the first section of the first electro-optic device is fabricated from a crystalline material.

10. An apparatus as in claim 1, wherein a voltage of less than 500 volts can be applied across electrodes of the first electro-optic device to achieve up to $2\pi$ retardation in the first section of the first electro-optic device.

11. An apparatus as in claim 1, wherein a voltage of less than several thousand volts can be applied across electrodes of the first electro-optic device to achieve up to $2\pi$ retardation in the first section of the first electro-optic device.

12. An apparatus as in claim 1 further comprising:
a second electro-optic device positioned between the beam splitter and the first electro-optic device to receive the polarization components of the optical input along separate paths, the second electro-optic device including electrodes across which a second voltage is applied to adjust a polarization orientation of the polarization components of the optical input along separate paths;
a third electro-optic device positioned between the first electro-optic device and the optical combiner to receive the optical components transmitted along separate paths through the first electro-optic device, the third electro-optic device including electrodes across which the second voltage is applied to adjust the polarization orientation of the optical components.

13. The apparatus of claim 12, wherein the second and third electro-optic devices comprise a pair of retarder devices each sandwiched between two parallel quarterwave plates.

14. The apparatus of claim 13, wherein the second and third electro-optic devices are coupled opposite to each other such that the second voltage applied across the electrodes of the second electro-optic device tilts a polarization axis of the optical input in a first direction and the second voltage applied across the electrodes of the third electro-optice device tilts the polarization axis of the optical input in a second direction that is opposite to the first direction for adjusting amplitude characteristics of the sinusoidal attenuation profile.

15. An apparatus as in claim 14, wherein the first section of the first electro-optic device and the pair of retarder devices are each chosen from the group comprising PLZT, PMN, PMN-PT, PLMNT, $LiNbO_3$, and $LiTaO_3$ for selecting the wavelength shift and the amplitude characteristics of the sinusoidal attenuation profile.

16. An apparatus for filtering light comprising:
a beam splitter that splits an optical input into polarization components along separate optical paths;
a first electro-optic device that receives the polarization components of the optical input along separate paths, the first electro-optic device including electrodes across which a first voltage is applied to adjust a corresponding wavelength transmission characteristic of the device a section of the first electro-optic device positioned between the electrodes having an adjustable birefringence depending on the applied first voltage; and
an optical combiner that combines the optical components transmitted along separate paths through the first electro-optic device to produce a filtered optical output; and a second electro-optic device positioned after the beam splitter to receive the components transmitted along separate paths, the second electro-optic device including electrodes across which a second voltage is applied to adjust a polarization orientation of the optical components wherein the second electro-optic device is a retarder device sandwiched between two quarterwave plates.

17. An apparatus as in claim 16 having an attenuation profile for filtering the optical input, wherein amplitude characteristics of the attenuation profile are adjusted based on the second voltage applied across the electrodes of the second electro-optic device.

18. An apparatus as in claim 17, wherein the attenuation profile is approximately sinusoidal over a range of frequencies.

19. An apparatus as in claim 16 having an attenuation profile for filtering the optical input, wherein phase characteristics of the attenuation profile are adjusted based on the first voltage applied across the electrodes of the first electro-optic device.

20. An apparatus as in claim 19, wherein the attenuation profile is approximately sinusoidal over a range of wavelengths.

21. An apparatus as in claim 16, wherein the second electro-optic device is a solid state device.

22. An apparatus as in claim 16, wherein the second electro-optic device is fabricated from a ceramic material.

23. An apparatus as in claim 16, wherein the second electro-optic device is fabricated from a crystalline material.

24. A method for filtering light comprising the steps of:
splitting an optical input into polarization components along separate paths;
positioning a first electro-optic device to receive the polarization components;
positioning a second electro-optic device to receive the polarization components transmitted along the separate paths;
applying an orientation adjustment of the second electro-optic device to adjust a polarization orientation of the optical components;
applying a voltage to electrodes of the first device to adjust birefringence and in turn adjust wavelength transmission characteristics of the first device, wherein phase characteristics of an attenuation profile to filter the optical input are adjusted by controlling the voltage across electrodes of the first electro-optic device, wherein the attenuation profile is approximately sinusoidal over a range of wavelengths; and
combining the polarization components passing through the first electro-optic device along separate paths to produce a filtered optical output.

25. A method as in claim 24, wherein the step of applying a voltage to electrodes of the first electro-optic device involves changing a phase of the polarization components transmitted along the separate paths such that the optical input is attenuated at selected wavelengths when the optical components are combined to produce the optical output.

26. A method as in claim 24 further comprising:
fabricating the first electro-optic device to include material from the group comprising PLZT, PMN, LiNbO$_3$, and LiTaO$_3$.

27. A method as in claim 24 further comprising the step of:
fabricating the body of the first electro-optic device to include a polymer material.

28. A method as in claim 24 further comprising:
fabricating the first electro-optic device to include a section of fixed birefringence.

29. A method as in claim 24 wherein the positioning a second electro-optic device step and the applying an orientation adjustment of the second electro-optic device step comprise the steps of:
positioning an optical rotator device to receive the polarization components transmitted along separate paths;
rotating corresponding components of the optical input via the optical rotator device.

30. A method as in claim 24 wherein the applying an orientation adjustment of the second electro-optic device step comprises the step of:
applying a second voltage across electrodes of the second electro-optic device to adjust the polarization orientation of the optical components.

31. A method as in claim 30 further comprising:
disposing two parallel quarterwave plates on the second electro-optic device.

32. A method as in claim 30, wherein amplitude characteristics of the sinusoidal attenuation profile to filter the optical input are adjusted by controlling the second voltage across electrodes of the second electro-optic device.

33. A method as in claim 30 further comprising the step of:
fabricating the second electro-optic device from ceramic material.

34. A method as in claim 30 further comprising the step of:
fabricating the second electro-optic device from a crystalline material.

35. A method as in claim 30 further comprising the step of:
fabricating the second electro-optic device to be a solid state device.

36. A method as in claim 30 further comprising the step of:
fabricating the first electro-optic device from ceramic material.

37. A method as in claim 24 further comprising the step of:
fabricating the first electro-optic device from a crystalline material.

38. A method as in claim 24 further comprising the step of:
fabricating the first electro-optic device to be a solid state device.

39. A method as in claim 24, wherein a voltage of less than 500 volts can be applied across electrodes of the first electro-optic device to achieve up to $2\pi$ retardation.

40. A method as in claim 24, wherein a voltage of less than several thousand volts can be applied across electrodes of the first electro-optic device to achieve up to $2\pi$ retardation.

* * * * *